Jan. 21, 1936.  J. E. HALE  2,028,702
VEHICLE WHEEL
Filed June 24, 1932

INVENTOR
James E. Hale

ATTORNEYS

Patented Jan. 21, 1936

2,028,702

UNITED STATES PATENT OFFICE 2,028,702

VEHICLE WHEEL

James E. Hale, Akron, Ohio, assignor to The Firestone Tire & Rubber Company, Akron, Ohio, a corporation of Ohio Application June 24, 1932, Serial No. 619,011

10 Claims. (Cl. 301—6)

This invention relates to vehicle wheels, and more especially it relates to vehicle wheels equipped with pneumatic tires.

The invention is of primary utility in its application to motor car vehicle wheels that carry low pressure tires of relatively large radial section, which tires sometimes are known as "superballoon" or "doughnut" tires. These low pressure tires frequently have a bead diameter as small as 15 inches or smaller, and since practically all of the larger size cars and many of the medium size cars are equipped with brake drums as large as 15 or 16 inches outside diameter, it has been impossible to use these tires on many wheels. Furthermore, there is a tendency in very large cross-section, small bead diameter tires to sway or roll laterally causing side sway or shimmy of the automobile.

In the present invention the difficulties inherent in prior practice have been overcome in a vehicle wheel having a tire-supporting rim that is of larger outside diameter on one side than on the other, so as to accommodate a brake drum on that side of the wheel having the larger rim diameter to brace the tire against lateral swaying, and in the provision of a novel pneumatic tire structure to be carried on said rim.

The chief objects of the invention are to provide a wheel capable of carrying a brake drum of large diameter and a low pressure tire of large volumetric capacity and standard overall dimentions; to provide a wheel having a tire rim of larger diameter on its inner side than on its outer side; to provide a pneumatic tire capable of seating on such a rim; to provide a tire construction which effectively eliminates or reduces side sway, lateral rolling action, and shimmy; and to provide a suitable construction for such a tire so that a balanced structure is effected.

Figure 2:
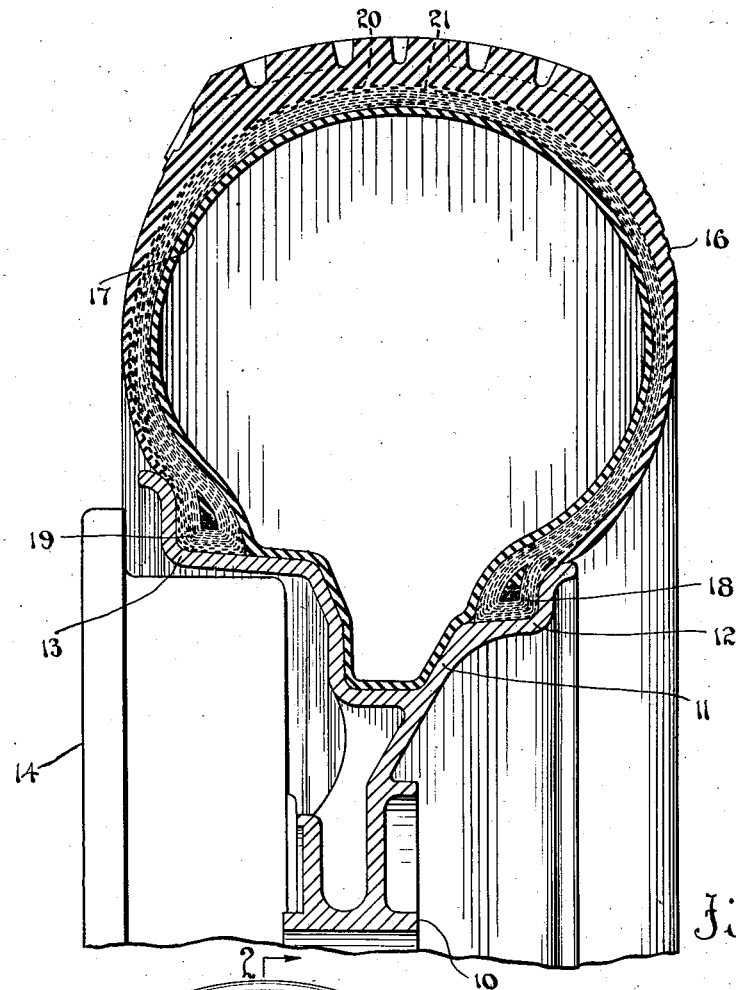
Figure 1:
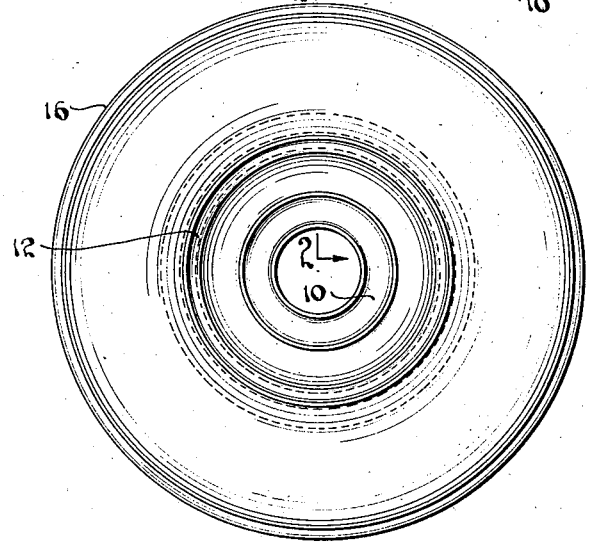

Of the accompanying drawing;

Figure 1 is a front-side elevation of a vehicle wheel embodying the invention; and Figure 2 is a section on the line 2—2 of Figure 1.

Referring to the drawing, 10 is metal wheel structure of the disc type that is peripherally formed with tire-supporting rim 11 of the dropcenter type, the latter comprising a front or outer tire-bead seat 12 and a rear or inner tire-bead seat 13. The diameter of the front bead seat 12 is such as to accommodate the bead of a standard, low pressure "doughnut" type pneumatic tire, which is usually about 13 to 16 inches. The diameter of the rear bead seat 13 is somewhat larger than that of the front bead seat, say about 17 inches. This construction permits a relatively large brake drum at least of 16 inches outside diameter to be mounted upon the rear side of the wheel, such a brake drum being indicated at 14, Figure 2.

Mounted upon the rim 11 of the wheel structure is a pneumatic tire casing 16, and an inner tube 17 therein. The tire 16 includes bead portions 18, 19 that seat upon the bead seats, 12, 13 respectively of the rim, the tire bead 18 being of smaller diameter than the tire bead 19. Thus it will be seen that the rear sidewall of the tire 16 has less radial width than the front sidewall, and consequently effectively eliminates or reduces the lateral rolling or swaying of the tire and of the wheel with respect to the road.

The rear sidewall of the tire may be subject to more severe strains due to sharper flexing on a shorter radius. In order to prevent premature failure of the rear sidewall, and to provide a tire structure that is uniform throughout in its ability to absorb the strains due to flexing, the rear or short side of the tire may have additional reinforcement in the form of one or more extra plies of fabric. As is shown in Figure 2, this reinforcement consists of two plies of weftless or weak-wefted cord fabric 20, 21, which plies have their inner marginal portions anchored around the bead 19 of the tire. The outer marginal portions of the plies 20, 21 preferably are integral with the breaker strips or tread reinforcing strips of the tire, and extend over the crown thereof as shown. However, other kinds of reinforcement may be employed, and such reinforcement may or may not be integral with the breaker of the tire or the extra cord plies under the tread.

Owing to the greater radial width of the rear side of the center well of the rim, the tire has substantially the volumetric capacity of the full "doughnut" type tire and possesses all the advantages of such tires including the same appearance when mounted on the wheel of a vehicle. In addition, the wheel achieves the several advantages set out in the foregoing statement of objects.

Modification may be resorted to without departing from the spirit of the invention or the scope of the appended claims, which are not limited wholly to the specific construction shown and described.

What is claimed is:

1. A pneumatic tire for vehicle wheels, said tire having bead portions of different diameters and sidewalls of different radial widths, the narrower sidewall having greater resistance to flexure than the wider sidewall.

2. A pneumatic tire having bead portions of different diameters and sidewalls of different radial widths, the narrower sidewall being additionally reinforced against flexing strains.

3. A pneumatic tire having bead portions of different diameters and sidewalls of different radial widths, the narrower sidewall being reinforced by including at least one more layer of fabric than the wider sidewall.

4. A pneumatic tire having bead portions of different diameters and sidewalls of different radial widths, said tire including plies of fabric extending from one bead portion to the other, and at least one ply that extends from the bead of larger diameter radially outwardly of the tire in the narrower sidewall, and terminating short of the wider sidewall.

5. A pneumatic tire having bead portions of different diameters and sidewalls of different radial widths, and reinforcement in the narrower sidewall integral with the breaker of the tire.

6. A pneumatic tire having bead portions of different diameters and sidewalls of different radial widths, said tire including plies extending from one bead of the tire to the other, and at least one ply that extends from the bead of larger diameter radially outwardly of the tire and over the crown of the tire, terminating short of the wider sidewall.

7. In a vehicle wheel, the combination of a wheel structure having a pneumatic tire-supporting rim thereon and a brake drum mounted adjacent said rim, the bead seating portion of the rim at the front of the wheel being of smaller radially inner and outer diameters than the bead seating portion at the rear of the wheel, the bead seating portion at the rear of the wheel overlapping said brake drum, and a pneumatic tire on said rim.

8. In a vehicle wheel, the combination of a wheel structure comprising a pneumatic tire-supporting rim and a brake drum, the tire bead seating portion of the rim at the rear of the wheel overlapping said brake drum, the tire bead seating portion of the rim at the front of the wheel being smaller in diameter than the tire bead seating portion of the rim at the rear of the wheel, and a pneumatic tire on said rim.

9. In a vehicle wheel, the combination of a wheel structure comprising a pneumatic tire-supporting rim and a brake drum, the tire bead seating portion of the rim at the rear of the wheel overlapping said brake drum, the tire bead seating portion of the rim at the front of the wheel being smaller in diameter than the brake drum, and a pneumatic tire on said rim.

10. In a vehicle wheel, the combination of a wheel structure, a brake drum mounted on said wheel, and a pneumatic tire mounted on said wheel with one of its beads in overlapping relation with respect to said brake drum, the other of the beads of said tire being smaller in diameter than the brake drum.

JAMES E. HALE.